Patented Aug. 28, 1951

2,565,998

UNITED STATES PATENT OFFICE 2,565,998

ALKYL PHENOLS AS STABILIZERS FOR SYNTHETIC RUBBER LATEX

Miller W. Swaney, Cranford, and Fred W. Banes, Roselle, N. J., assignors to Standard Oil Development Company, a corporation of Delaware No Drawing. Application November 28, 1944, Serial No. 565,572

9 Claims. (Cl. 260—29.7)

This invention pertains to improvements in synthetic rubber latex dispersions such as are obtained by polymerization of conjugated diolefins or mixtures of conjugated diolefins with other copolymerizable materials in aqueous emulsion and particularly to the stabilization of such latices against degradation.

It is common practice to protect natural rubber against deterioration by atmospheric action by incorporating in the rubber various organic substances such as phenyl-beta-naphthylamine, naphthols, substituted naphthols, substituted phenols, substituted catechols, substituted hydroquinones, alkyl phenol sulfides, ketone-amine condensation products and the like. In order to serve as a natural rubber age resistor, the added agent merely has to possess some antioxidant properties and maintain some sort of solubility in the rubber. In addition, the undissolved portions of the agent must be well dispersed mechanically or physically in the viscous rubber medium. The above mentioned age resistors can be added easily to the dry rubbers by simple milling of the two, preferably above the melting point of the stabilizer.

In recent years various methods have been developed for producing synthetic rubbers such as neoprene by the polymerization of chlorobutadiene, and the Buna rubbers by the polymerization of conjugated diolefins alone or in combination with styrenes (Buna S) and in combination with acrylonitrile (Buna N or Perbunan). Although these synthetic rubbers differ from natural rubber in certain respects, neoprene and Buna-N or Perbunan for example being much more resistant to the action of solvents than natural rubber, they all lend themselves to stabilization in the dry state in substantially the same manner as natural rubber.

On the other hand, the stabilization of synthetic rubber latices is a very different matter from either the stabilization of natural or synthetic rubbers in the dry state or the stabilization of natural rubber latex. The differences in and the complexities of the problems encountered in the stabilization of synthetic rubber latices of the Buna type, e. g., butadiene-styrene emulsion copolymers and butadiene-acrylonitrile emulsion copolymers can be appreciated only through a thorough understanding of the factors which render it necessary to stabilize these synthetic latices.

In the first place, it is noted that natural rubber latex requires no additional stabilization to speak of, while in latex form. By its very nature, it represents a dispersion of a high molecular weight, preformed and fully reacted polymer which, besides existing in the complete or substantially complete absence of any monomeric or polymerizable substances, contains various polyamines and phenolic substances which nature has provided in situ. Natural rubber, therefore, requires artificial stabilization only when fabricated into dry rubber articles which are compounded in order to get maximum resistance to aging.

In the preparation of the Buna emulsion polymers, however, very pure and highly reactive unsaturated compounds such as butadiene or isoprene and acrylonitrile or styrene are emulsified in an aqueous medium, say a soap solution, containing appropriate catalysts, accelerators, promoters, etc. and the copolymerization reaction proceeds at a high rate until a rubbery polymer of the desired consistency and physical properties is attained. This is generally at a reaction conversion such that a considerable proportion, generally about 25% of the original monomers, remain unreacted, but in a medium or system which is still highly conducive to reaction. In addition, the polymer chains themselves conain many unsaturated side vinyl groups ($-CH=CH_2$) of high reactivity which are not believed to be present in natural rubber. These side vinyl groups which are present in the emulsion polymerizates of the Buna type easily form cross linkages between polymer chains leading to undesirable tough and insoluble (gelled) rubbers unless these undesirable side reactions or "after-polymerizations" are prevented by proper stabilizing or "short-stopping" the polymerization system. This involves not only neutralizing or inhibiting the chain-initiating processes going on in the liquid phase but similar chain initiating, cross-linking or growth mechanisms going on in the dispersed polymer phase. Since these conditions do not exist perceptibly in natural rubber latex, it may readily be seen why stabilization of these synthetic latices presents a problem which was not encountered until synthetic rubber latices were developed.

A desideratum in the stabilization of emulsion polymerizates of the Buna type is that a single material be suitable, not only for stabilizing the polymer in latex form, but also for stabilizing the polymer in solid or dry form. In view of the fact that the antioxidant types of rubber stabilizers are organic in nature and oil soluble or polymer-soluble and consequently substantially insoluble in water, it is very essential that these substances be well dispersed in finely divided form when added to the latex, and that they remain well dispersed in the latex.

When a good dispersion of phenyl-beta-naphthylamine crystals, such as are obtained by extended ball-milling of the crystals in a soap solution and possessing uniform particle size of the order of 1 micron diameter, is added to natural rubber latex, also of particle size about 1 micron diameter, the stabilizer remains well dispersed, as can be determined by viewing a specimen under high magnification (500X) in polarized light between crossed Nicol prisms. This good compatibility is possibly attributable to the fact that the masses of the stabilizer and natural rubber particles are about the same, and the interfacial area per particle is about the same, the emulsifier being shared by both. On the other hand when the same stabilizer dispersion (e. g., phenyl-beta-naphthylamine in sodium oleate medium) is added to a latex of a butadiene-acrylonitrile copolymer prepared with sodium oleate as the emulsifier, immediate and usually fairly complete agglomeration of the stabilizer occurs. Consequently, good short-stopping or stabilization of these latices is impossible because too little surface of the stabilizer remains exposed to permit adequate diffusion of the stabilizer throughout the aqueous medium and into the polymer phase. This agglomeration is usually so severe that it can be observed to occur with the unaided eye, and on standing the bulk of the stabilizer will separate from the rubber latex.

The same is on the whole true of all the commercial rubber stabilizers available. The reason for this stabilizer agglomeration appears rather clearly associated with the extremely small particle size and large interfacial area of the Buna rubber particles relative to the stabilizer particles. Whereas the particle size of the dispersed stabilizer particles is of the order of 1 micron, the size of the butadiene-acrylonitrile or butadiene-styrene copolymer particles range from 0.025 to about 0.08 micron diameter. Therefore in a butadiene-acrylonitrile latex to which has been added about 2% of stabilizer based on the rubber present, there are about one million such rubber particles for each single stabilizer particle present. In consequence of the tremendous preponderance of interface of the rubber relative to the stabilizer interface, the rubber latex particles rob the stabilizer of its dispersing agent and cause selective agglomeration of the stabilizer. This explanation is confirmed by the fact that if the Buna rubber latex is titrated with additional soap (in the usual commercial latices of this type the rubber particle interface is only partially satisfied by adsorbed soap due to a deficiency of the latter) until the total interface is fully satisfied with regard to adsorbed soap films, then the customary stabilizer dispersions can be added without coagulation occurring. However, this is rather impractical since it necessitates raising the total soap content of the latex to an amount too large to be economically feasible. It may thus be seen that the extremely small size of the synthetic rubber latex particles makes for an additional problem in latex stabilization that is not encountered with natural rubber latex.

It is the object of this invention to provide the art with an antioxidant for synthetic rubber latices which will efficiently terminate the reaction, inhibit further reaction while monomers are present and prevent the deterioration of the polymer particles in the latex form.

It is also the object of this invention to provide the art with hydrocarbon soluble type organic antioxidants which may be readily and uniformly dispersed throughout synthetic latices obtained by the polymerization of highly reactive diolefinic and vinyl compounds in aqueous emulsion.

It is also the object of this invention to stabilize synthetic emulsion polymer latices of the Buna type against after-polymerization and other deterioration by adding thereto, as soon as possible after the necessary reactions have been concluded, dispersions, or solutions capable of forming dispersions when added to the latex, of antioxidants of the type described below.

These and other objects will appear more clearly from the detailed specification and claims which follow.

We have now found, after testing a large number of commercial and experimentally prepared stabilizer dispersions, that one type of stabilizer dispersion displays an outstanding degree of compatibility with Buna type latices, this being dispersions of the di-tertiary-butyl derivatives of cresols. Although this general type of material has heretofore been proposed for the stabilization of dry rubber, along with many other organic substances, it is considered entirely unexpected that dispersions of these particular materials should prove to be more compatible with Buna latices than the numerous other types of dispersed stabilizers and antioxidants such as the arylamines and the like. In fact the compatibility of the di-tertiary-butylated cresols with Buna latex is excellent and even on prolonged standing or on visual inspection under the polarizing microscope between crossed-Nicol prisms there is absolutely no tendency toward agglomeration, presumably (but not necessarily) because the interfacial adsorptive power of the di-tertiary-butylated cresols for emulsifiers is much greater than that of the other types of stabilizers.

The specific type of stabilizer we have found to be suitable for the stabilization of Buna latices is produced by the alkylation of phenols such as para-cresol with isoolefins such as isobutylene, for instance, as catalyzed by a trace of an acid type catalyst such as sulfuric, cresol-sulfonic acid, etc. or other suitable type of alkylation catalyst. The material found eminently satisfactory is the di-tertiary-butyl derivative of para-cresol which in reasonably pure form (though possibly containing different isomers) is a crystalline solid melting at 68–69° C. This substance can be prepared in several ways, an example being the following: into para-cresol containing a trace (0.1 to 2%) of conc. sulfuric acid or a phenol-, or cresol-sulfonic acid, etc., is bubbled isobutylene at about 50°–60° C. until about two molar equivalents have been absorbed indicating a substantially complete reaction. To this mixture is then added a little base, for example, $Ba(OH)_2$, $CaCO_3$, NaOH, etc., to neutralize the acid catalyst and prevent subsequent dealkylation. The mixture is then subjected to distillation under reduced pressure to remove isobutylene, isobutylene polymers, unreacted cresol and monobutylated cresol. The residue, containing largely the dibutylated cresol can be further purified by vacuum distillation (about 150° C. @ 25 mm. Hg.) or by recrystallization from alcohol or other suitable solvent to yield a crystalline material of the melting point stated above. Instead of using para cresol, one may also use ortho or meta cresol or other monobasic phenols and instead of isobutylene one may use other isoolefins such as isoamylene and the like. For a further description of the preparation of alkylated phenols reference is made to an article entitled "Alkylated Cresols from Refinery Gases" by Wernrich in Ind. Eng. Chem. vol. 35, page 265 (1943).

This invention is applicable to synthetic rubber latices which are prepared, as is well known, by the polymerization in aqueous emulsion, of conjugated diolefins such as butadiene-1,3, isoprene, piperylene, dimethyl butadiene, methyl pentadiene and the like taken singly or in combination and in admixture with other polymerizable compounds such as styrene, alpha methyl styrene, para methyl styrene, alpha methyl para methyl styrene, halogenated styrenes such as chloro- or bromo-styrene, acrylonitrile, methacrylonitrile, acrylic acid and methacrylic acid esters such as methyl acrylate and methyl methacrylate, fumaric acid esters such as ethyl fumarate, and unsaturated ketones such as methyl vinyl ketone and methyl isopropenyl ketone and also to resin latices prepared by polymerizing monoolefins such as styrene, methyl methacrylate, methyl isopropenyl ketone and the like in aqueous emulsion. It is also applicable to these latices before, during or after creaming as described in application Ser. No. 556,659, filed September 30, 1944 by E. Arundale, now U. S. Patent 2,444,801. These latices will be referred to hereinafter as synthetic latices or synthetic rubber latices of the Buna type and are not to be confused with any artificial latices prepared by dispersing solid polymerizates whether natural or synthetic in nature.

The synthetic rubber latices which are stabilized in accordance with this invention are prepared by emulsifying the reactants in from about an equal to a twofold quantity of water using as the emulsifier water-soluble soaps such as alkali metal or ammonium oleates, stearates, palmitates as well as various surface-active agents such as salts of alkylated naphthalene sulfonic acids, fatty alcohol sulfates, salts of aliphatic and olefinic sulfonic acids and also acid addition salts of high molecular alkyl amines. The amount of emulsifier used is ordinarily about 0.5 to about 5 weight per cent based on the reactants. A polymerization catalyst such as benzoyl peroxide, hydrogen peroxide and alkali metal or ammonium perborates or persulfates or the like are provided in the reaction mixture in amounts of about 0.05 to about 0.6 weight per cent based on reactants. It is ordinarily preferred to provide a suitable polymerization modifier or promoter such as dialkyl xanthogen disulfides or aliphatic mercaptans containing at least 7 carbon atoms in an aliphatic linkage such as heptyl, octyl, decyl, dodecyl, Lorol or benzyl mercaptan in the reaction mixture in amounts of between about 0.2 to about 1.0 weight per cent based upon the reactants present. The reaction mixture is maintained at the desired temperature of between about 15° C. and about 65° C. for a length of time sufficient to convert a major proportion, generally about 75%, of the reactants to a rubbery polymer of the desired consistency. Ordinarily, about 12 to about 18 hours are required to reach this conversion. The proportions of materials used, temperatures, times of reaction, etc. are well known or understood by the art and form no part of the present invention.

When the desired conversion level is reached, a polymer stabilizer of the type disclosed above is added. The latex may then be stripped of unreacted monomers by subjecting to steam-distillation, preferably under reduced pressure.

The stabilizer may be prepared in the form of a dispersion for addition to the reaction mixture by grinding the stabilizer in a ball or colloid mill in the presence of soap or other dispersing agent and in the presence, if desired, of suitable protective colloids such as glue or the like. Instead of dispersing the stabilizer in the foregoing manner, it may be dissolved in a suitable solvent such as aromatic hydrocarbons, alcohols, of at least four carbon atoms, etc., which will form a satisfactory dispersion when added to the latex. The amount of stabilizer added is ordinarily about 0.1% to 2% based on the rubber although larger amounts such as up to about 6–7% may be used.

The advantages of the present invention will become apparent from the following specific examples which are illustrative of this invention.

*Example 1*

A butadiene-acrylonitrile latex at a pH of about 8.0–8.4 containing about 25% of rubber solids and 2½% of sodium oleate, based on the water, was prepared by copolymerizing butadiene and acrylonitrile in approximately a 3 to 1 molar ratio, the polymerization being carried to approximately a 75% conversion of monomers to polymers. To this latex was then added a minor proportion of a ball-mill dispersion of 33% by weight of phenyl-beta-naphthylamine in 5% sodium oleate solution of very fine particle size, the amount of stabilizer being approximately 2% based on the rubber present. After the stabilizer dispersion had been stirred in thoroughly a drop of the mixture, when examined under the microscope was found to contain most of the stabilizer particles in the form of large clusters or agglomerates. This condition was visible with the unaided eye on close examination. When the latex was allowed to stand undisturbed, the bulk of the stabilizer agglomerates settled. As shown in a later example, this condition does not lead to adequate stabilization. When this experiment was repeated using the latex of an emulsion copolymer of butadiene and styrene, a similar behavior was observed. Similar dispersions of other commercial rubber antioxidants of the aromatic amine type such as the condensation products of acetone with diphenylamine, or of a ketone with phenyl-beta-naphthylamine, known to the trade as "Aminox" and "Betanox" respectively, and the like were added to Buna latices and in every case agglomeration of the stabilizer occurred. Also, when ball-mill dispersions of phenyl-beta-naphthylamine in a large number of sulfated and sulfonated and natural emulsifying agents were tested, the same type and about the same degree of agglomeration occurred.

*Example 2*

A ball-mill dispersion of the hereinbefore described ditertiary-butyl cresol derivative melting at 68°–69° C. was prepared by ball-milling for several days a mixture of 800 parts of water, 400 parts of the ditertiary butylated para cresol, 24 parts of soap flakes, 40 parts of a commercial dispersing agent, and 8 parts of glue flakes. The stable dispersion resulting was found to consist of particle sizes of predominantly about 1 micron dimension.

The dispersion so prepared was added in several concentrations to a Buna latex of the type prepared according to Example 1, in amounts equivalent to as much as 6% based on the rubber. When viewed under the microscope, all of the mixtures prepared displayed excellent compatibility with no tendency toward agglomeration. On standing for long periods no separation of antioxidant from the latex was observed.

The latex containing the dispersion of tertiary butylated para cresol may be readily stripped of unreacted butadiene and acrylonitrile by steam distillation under reduced pressure without undergoing any appreciable degradation in product quality and without any separation of the antioxidant. Moreover, the stripped latex may be creamed to about 50% rubber solids, for example, by heating to about 60° C., adding dilute (1-7%) solution of ammonium chloride, maintaining the mixture at about 55–60° C. for an hour or more, adding ammonium hydroxide to raise the pH of the mixture to about 9.5, adding a creaming agent such as a 2% solution of ammonium alginate, allowing the cream and serum to stratify and separating the cream. The ditertiary butyl para cresol prevents oxidative degradation of the latex particles not only during the processing of the latex but also during prolonged storage of the resultant creams.

When the dispersion prepared above was added to a Buna latex of a copolymer of butadiene and styrene, excellent compatibility was observed.

When the dispersion prepared above was added to a Buna latex of a copolymer of butadiene and alpha-methyl-para-methyl-styrene, excellent compatibility was observed.

In addition to possessing a high and singularly unique degree of stability with the Buna type synthetic latices, the ditertiary-butyl cresol derivatives are highly effective in stabilizing these rubbers as indicated by the following experiments:

Example 3

A fresh latex of a butadiene-acrylonitrile copolymer was prepared in a manner similar to that described in Example 1. The master latex obtained was divided into several similar portions. To the first portion no stabilizer was added. To the second was added a dispersion of phenyl-beta-naphthylamine (2% based on the rubber), prepared in an identical manner and with the identical ingredients used in preparing the stabilizer dispersion described in Example 2. To a third was added an equivalent amount of a commercial rubber stabilizer known as Aminox, which had been prepared by ball milling the dry power with an equal quantity of water containing 10% of a dispersing agent and 2% of glue. To a fourth portion was added 2% of di-tertiary-butyl cresol in the form of the dispersion described in Example 2. Each latex mixture was then stripped at 60°–70° C. for 2 hours with an inert gas to remove unreacted butadiene and acrylonitrile, coagulated with brine into a crumb form, slurry washed several times with distilled water, and finally dried in a circulating air oven at 200° F. for 5½ hours. Each product was then measured for plasticity by the Williams Plasticity-Recovery Method well known in the rubber industry. In this test the lower the figures obtained, the better the plasticity of the rubber, and the better stabilized is the rubber. Furthermore, each polymer was analyzed for gel content (insoluble in benzene due to the formation of undesirable cross-linkages through after-polymerization), and the amount of gel swelling index (a measure of the degree of cross-linking in the gel structure; the smaller the swelling index, the more highly cross-linked the gel). A polymer of high gel and low swell would indicate a poorer stabilized polymer than one of low gel and high swell. The data tabulated below indicate the ditertiary butyl cresol material to be a very effective stabilizer when added to this butadiene-acrylonitrile latex.

| Stabilizer Added to Latex | Williams Plasticity-Recovery | Per Cent Gel in Polymer (and swelling index) |
|---|---|---|
| None | 204–226 | 67(17X) |
| 2% Phenyl-beta-naphthylamine | 149–124 | 42(80X) |
| 2% Aminox | 160–131 | 51(55X) |
| 2% Di-t.-butyl cresol | 140– 89 | 0 |

Example 4

The following materials were milled in a ball mill for 24 hours:

333 parts by weight of di-t-butylated p-cresol (M. P. 68°–69° C.).
643 parts by weight of water.
20 parts by weight of a commercial dispersing agent.
3.3 parts by weight of glue flakes.
10 parts by weight of soap flakes.
0.33 parts by weight of Collatone, a para-chloro-meta-cresol preservative.

The resulting dispersion was of excellent particle size and uniformity and exhibited excellent compatability when mixed with Buna N latex such as described in Example 1, and also with Buna S latex.

Example 5

The following ingredients were mixed in a ball mill for 24 hours:

300 parts by weight of di-t-butylated p-cresol (M. P. 68°–69° C.).
680 parts by weight of water.
20 parts by weight of soap flakes.
20 parts by weight of Daxad-11, a synthetic sulfonate type wetting agent (a polymerized sodium salt of alkyl naphthalene sulfonic acids).

The resulting dispersion was of excellent particle size and uniformity and exhibited excellent compatibility with Buna N latex and Buna S latex.

Example 6

The following substances were ball-milled for 24 hours:

200 parts by weight of di-t-butyl-p-cresol of M. P. 68°–69° C.
430 parts by weight of water.
33.4 parts by weight of soap flakes.
3.3 parts by weight of glue.

The resulting dispersion was of excellent particle size and uniformity and of excellent compatibility with Buna latex of both the N and S types.

Example 7

In order to affirm the excellent latex short-stopping qualities of the di-t-butyl-p-cresol derivative a latex of a butadiene/acrylonitrile copolymer similar to that described in Example 1 was divided into two portions. To these were added, respectively; (1) 0.2% di-t-butyl-p-cresol, added as a ball-mill dispersion, and (2) 0.2% sodium hydrosulfate ($Na_2S_2O_4$), a strong reducing agent. These latices were then stripped, coagulated, washed, dried, etc. and their plasticities determined. No additional antioxidant was added in any case. The data below clearly show the good qualities of the cresol derivative. The Mooney Viscosity was determined at 212° F. This test is well known in the rubber industry and is described in some detail by Mooney, Ind. Eng. Chem. 2, 147 (1934).

| Short-Stop Added | Per Cent Gel in Polymer | Mooney Viscosity | |
|---|---|---|---|
| | | 4 min. | 15 min. |
| 0.2% di-t-butyl-p-cresol | 0 | 80 | 64 |
| 0.2% $Na_2S_2O_4$ | 45 | 122 | 115 |

*Example 8*

A latex of Buna N rubber similar to that described in Example 1 was divided into two portions. These were short-stopped and stabilized with the following materials: (1) 2% of phenyl-beta-naphthylamine (based on rubber) and, (2) 0.2% di-t-butyl-p-cresol added as a ball mill dispersion plus 2% diisobutyl-phenol sulfide. After stripping and polymer recovery and drying the polymer plasticities were run.

| Stabilizers Added | Williams Plasticity Recovery | Mooney Viscosity | |
|---|---|---|---|
| | | 4 min. | 15 min. |
| 2% phenol-beta-naphthylamine | 173-23 | 98 | 93 |
| 0.2% di-ter-butyl cresol+2% diisobutyl phenol sulfide | 111-16 | 66 | 53 |

The foregoing description contains a limited number of embodiments of the present invention. It will be understood, however, that the foregoing examples are merely illustrative of the present invention and that the latter is not limited to the specific conditions described since numerous variations are possible without departing from the general concept of our invention as disclosed herein.

What we claim and desire to secure by Letters Patent is:

1. A method which comprises polymerizing in aqueous emulsion a conjugated diolefin having from 4 to 6 carbon atoms to form a synthetic rubber latex, adding to the latex 0.1 to 7% based on the weight of rubber of a di-ter-alkyl cresol having from 4 to 5 carbon atoms per alkyl group, and thereafter stripping the latex of unreacted monomer by means of a gaseous stripping agent at a temperature between 60 and 70° C.

2. A method according to claim 1 wherein the stripping is carried out at subatmospheric pressure and wherein the stripping agent is steam.

3. A composition comprising a synthetic rubber latex obtained by polymerization in aqueous emulsion of a major proportion of butadiene-1,3 and a minor proportion of acrylonitrile and, as a stabilizing agent therefor, 0.2% by weight of rubber of di-ter-butyl p-cresol and 2% by weight of rubber of diisobutyl phenol sulfide.

4. In a method of stabilizing a synthetic rubber latex obtained by copolymerization in aqueous emulsion of a major proportion of butadiene-1,3 and a minor proportion of acrylonitrile, the improvement which comprises adding to the latex about 0.1 to 2% by weight of rubber of di-ter-butyl cresol and about 2% by weight of rubber of diisobutyl phenol sulfide.

5. As a latex stabilizing composition, an aqueous dispersion comprising about 800 parts by weight of water, about 400 parts by weight of di-ter-butyl p-cresol having a melting point between 68 and 69° C., about 24 parts by weight of soap and about 8 parts by weight of glue; the dispersed particles having predominately the size of about 1 micron.

6. A process for preparing a latex stabilizing agent which comprises ball-milling for about 24 hours 200 parts by weight of di-ter-butyl p-cresol having a melting point between 68 and 69° C., about 430 parts by weight of water, about 33.4 parts by weight of soap flakes and about 3.3 parts by weight of glue.

7. A method which comprises polymerizing in aqueous emulsion a mixture of a major proportion of butadiene-1,3 and a minor proportion of styrene to form a synthetic rubber latex, adding to the latex 0.1 to 2.0% based on the weight of rubber of di-tert-butyl-p-cresol, and thereafter stripping the latex of unreacted monomer by means of a gaseous stripping agent at a temperature between 60 and 70° C.

8. A method which comprises polymerizing in aqueous emulsion a mixture of a major proportion of butadiene-1,3 and a minor proportion of acrylonitrile to form a synthetic rubber latex, adding to the latex 0.1 to 2.0% based on the weight of rubber of di-tert-butyl-p-cresol, and thereafter stripping the latex of unreacted monomer by means of a gaseous stripping agent at a temperature between 60 and 70° C.

9. A method which comprises polymerizing in aqueous emulsion a mixture of a major proportion of a butadiene-1,3 hydrocarbon with a minor proportion of a copolymerizable compound containing a single C=C linkage to form a synthetic rubber latex, adding to the latex 0.1 to 7.0% based on the weight of rubber of di-tertiary-butyl cresol, and thereafter stripping the latex of unreacted monomer at a temperature between 60 and 70° C. and at subatmospheric pressure by means of steam as a stripping agent.

MILLER W. SWANEY.
FRED W. BANES.

REFERENCES CITED

The following references are of record in the file of this patent:

UNITED STATES PATENTS

| Number | Name | Date |
|---|---|---|
| 2,002,622 | Williams | May 28, 1935 |
| 2,061,111 | Stevens et al. | Nov. 17, 1936 |
| 2,181,102 | Stoesser | Nov. 21, 1939 |
| 2,202,877 | Stevens et al. | June 4, 1940 |
| 2,230,894 | Gumlich | Feb. 4, 1941 |
| 2,244,021 | Rosen | June 3, 1941 |
| 2,265,582 | Stevens et al. | Dec. 9, 1941 |
| 2,270,959 | Murke et al. | Jan. 27, 1942 |
| 2,356,929 | Hart | Aug. 29, 1944 |
| 2,362,052 | Craig | Nov. 7, 1944 |
| 2,364,338 | Beaver | Dec. 5, 1944 |
| 2,375,042 | Semon | May 1, 1945 |
| 2,455,714 | Waterman et al. | Dec. 7, 1948 |

OTHER REFERENCES

Barron: Modern Synthetic Rubbers, page 159, 2nd ed. published 1943 in New York by D. Van Nostrand Co., Inc.